United States Patent
Maples

[15] 3,683,557
[45] Aug. 15, 1972

[54] HOSE SAW
[72] Inventor: William A. Maples, Manitowoc, Wis.
[73] Assignee: Imperial-Eastman Corporation
[22] Filed: Nov. 5, 1970
[21] Appl. No.: 87,257

[52] U.S. Cl..................51/37, 51/227 R, 83/176, 83/451, 83/489, 143/6 G
[51] Int. Cl.....................B24b 19/00, B24b 23/00
[58] Field of Search..........143/6 G; 83/451, 175, 176, 83/489; 51/37, 34 C, 227 R, 170 PT

[56] References Cited

UNITED STATES PATENTS

| | | | |
|---|---|---|---|
| 3,232,159 | 2/1966 | Stanley | 83/451 |
| 2,596,524 | 5/1952 | Bridwell | 143/6 G |
| 2,925,005 | 2/1960 | Hensley | 83/456 |
| 2,941,554 | 6/1960 | Long | 143/6 G |
| 2,903,026 | 9/1959 | Frydenlund | 143/6 G |

*Primary Examiner*—Donald G. Kelly
*Attorney*—Hofgren, Wegner, Allen, Stellman & McCord

[57] ABSTRACT

Apparatus for cutting flexible tubing such as hose by means of a hand tool having a rotary cutting wheel. The apparatus includes a slide plate and structure for guiding the hand tool, herein more specifically a circular saw, in a preselected path with the cutting wheel passing through the apex of an arcuately retained hose portion. The apparatus includes improved adjustable structure for holding different size hoses in the arcuate configuration for suitable cutting by the wheel.

13 Claims, 5 Drawing Figures

Patented Aug. 15, 1972

INVENTOR
WILLIAM A. MAPLES
BY Hofgren, Wegner, Allen, Stellman, & McCord
ATTORNEYS Patented Aug. 15, 1972 3,683,557

HOSE SAW

BACKGROUND OF THE INVENTION

1. Field of the Invention

This invention relates to cutting apparatus and in particular to apparatus for cutting flexible tubing.

2. Description of the Prior Art

A number of devices have been developed for cutting flexible tubing such as rubber hose. One such device comprises a structural support pivotally carrying a rotary saw with a hose retainer disposed to hold the portion of the hose to be cut in an arcuate configuration for engagement by the saw blade as the saw is pivoted to the hose cutting position. Such cutting means have the disadvantage of limited facility in the use of different circular saw tools and the requirement that the circular saw tool either be permanently associated with the apparatus or requires mounting and dismounting of the circular saw tool on the pivot means. Another disadvantage of the known structures is in the provision of means for holding the tubing to be cut in the form of a series of apertures arranged obliquely to the plane of the cutting wheel.

SUMMARY OF THE INVENTION

The present invention eliminates the above discussed disadvantages of the known hose cutting apparatuses in a novel and simple manner. Thus, the present invention comprehends the provision of an apparatus wherein a conventional circular saw provided with a suitable cutting wheel may be slidably urged to cause the cutting wheel to cut through the tubing end held in an arcuate configuration subjacent the slide member. Suitable adjustable guides are provided permitting use of any one of a plurality of different circular saw tools as the cutting means. No attachment of the circular saw tool to the other elements of the apparatus is required, thus providing for facilitated use of the circular saw tool in the combination.

The apparatus further includes stop means for limiting the movement of the circular saw on the slide surface. Still further, the apparatus includes improved means for retaining the flexible tubular element to be cut in the desired arcuate configuration. More specifically, the retaining means comprises a plurality of apertures spaced apart along a line perpendicular to the plane of the cutting wheel providing facilitated disposition of the tubing in the desired arcuate configuration with the apex thereof in a cutting position for improved engagement by the cutting wheel of the circular saw tool.

The slide plate may comprise a pair of plates spaced apart to define a slot for the passage of the cutting wheel downwardly therethrough. The retaining means may further define means for holding the separate slide plate portions in fixed preselected spaced association.

The hose cutting apparatus of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
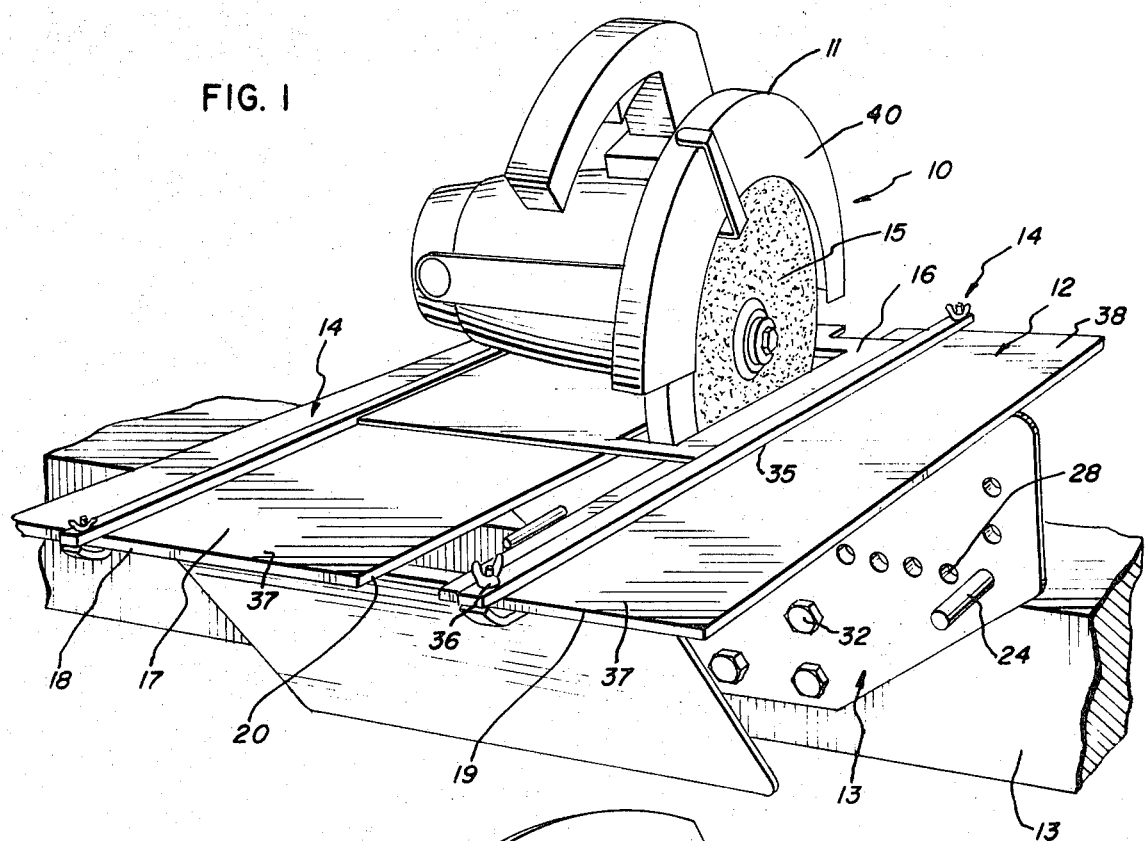
FIG. 1 is a front perspective view of an apparatus for cutting flexible tubing embodying the invention.

In the exemplary embodiment of the invention as shown in the drawing, an apparatus generally designated 10 for cutting flexible tubing T is shown to include a hand tool comprising a conventional circular saw tool 11, slide plate means generally designated 12, means generally designated 13 for holding the tubing in position to be cut, and adjustable guide means generally designated 14 for guiding the hand saw tool to effect the desired cutting of the retained tubing. The apparatus is adapted for use with any one of a plurality of different hand saw tools 11 which are utilized in conjunction with the slide plate means 12 and guide means 14 in a conventional circular saw guiding manner.

As shown in the drawing, the cutting wheel 15 may comprise an abrasive disc adapted to provide optimum cutting of material such as plastic or rubber hose. Circular saw tool 11 is used in the conventional manner by merely sliding the slide portion 16 thereof on the upper surface 17 of the slide plate 12, the movement of the circular saw tool being guided by guide means 14. Thus, there need be no mechanical connection between the circular saw tool and the other elements of the apparatus permitting the use of a conventional circular saw with maximum facility.

Figure 2:
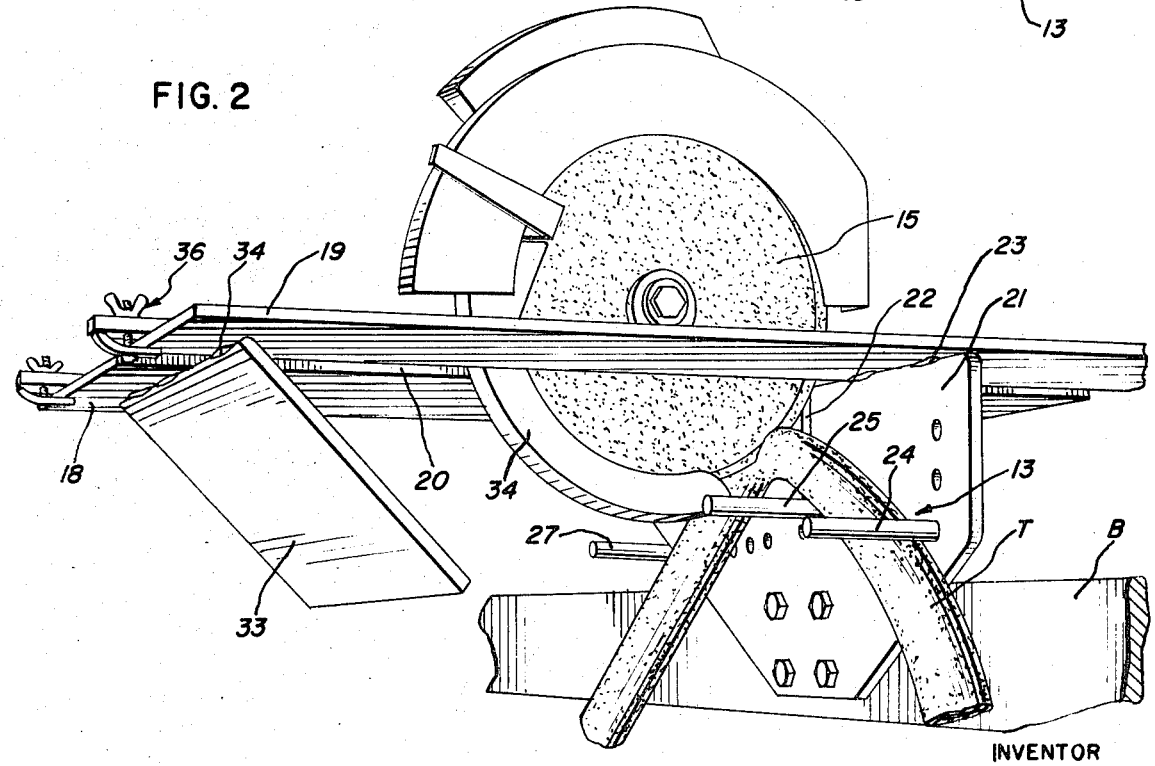
FIG. 2 is a right side perspective view thereof.
Figure 3:
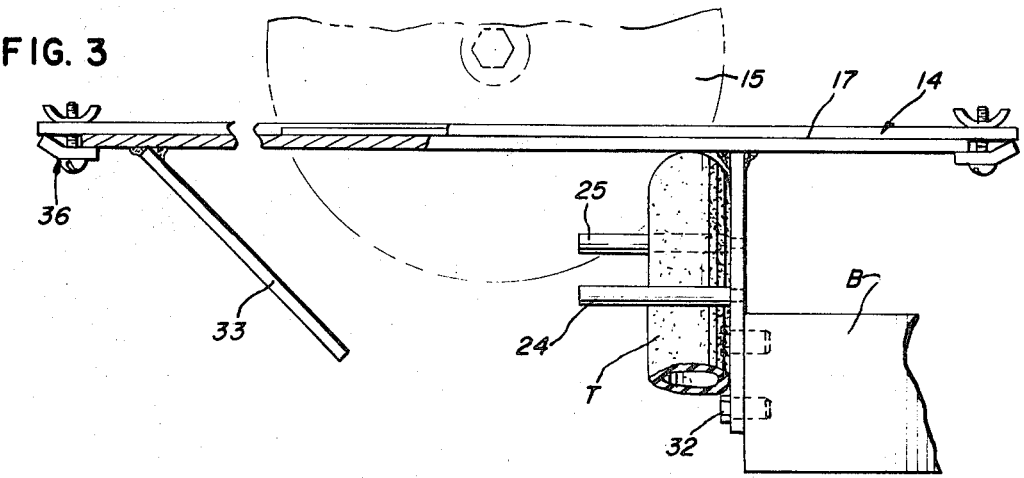
FIG. 3 is a fragmentary right side elevation thereof.
Figure 4:
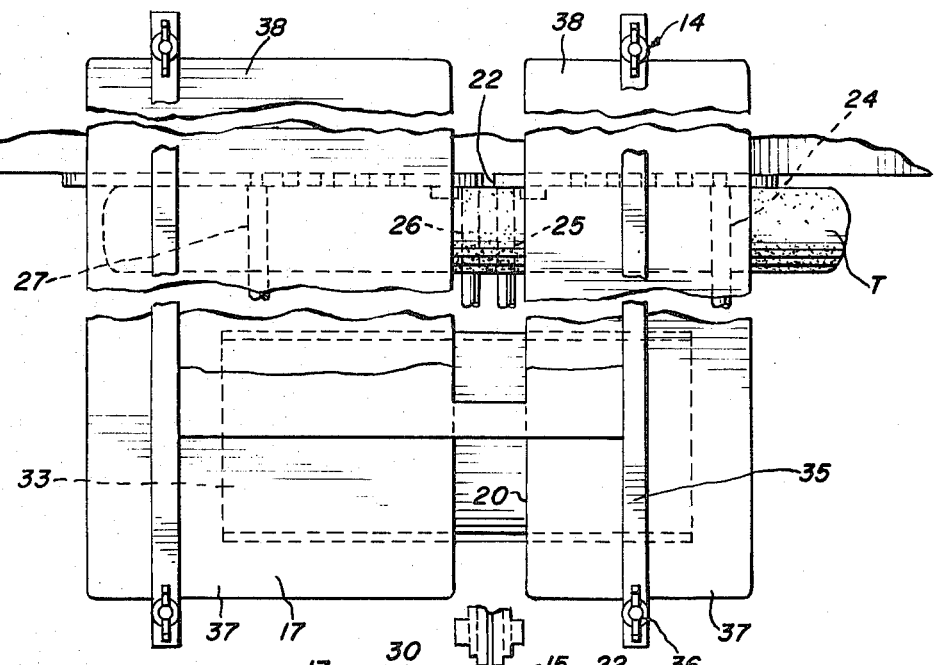
FIG. 4 is a fragmentary top plan view of the apparatus with the circular saw tool omitted.

More specifically, slide plate means 12 may comprise a pair of plates 18 and 19 which are spaced apart to define a slot 20 downwardly through which the cutting wheel 15 projects to engage the tubing T as best seen in FIG. 2. Slide plates 18 and 19 are maintained in accurately spaced association by means of a depending support 21 which carries tube holding means 13, also as best seen in FIG. 2. Support 21 is provided with a slot 22 permitting the leading edge of the cutting wheel 15 to pass therethrough at the forward extreme of the sliding movement of the saw on the table, effectively defined by slide plate means 12. Support 21 may be secured to the plates 18 and 19 by suitable means such as welds 23.

Figure 5:
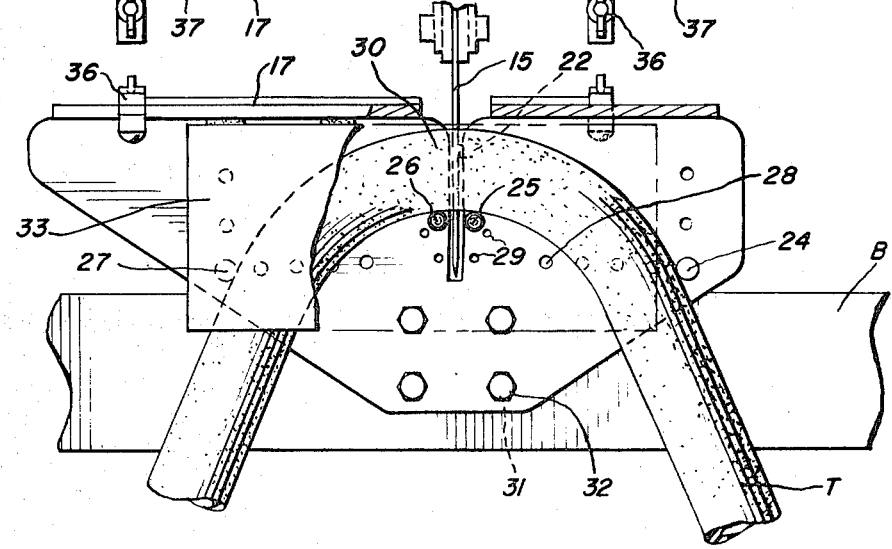
FIG. 5 is a fragmentary front elevation with portions broken away to facilitate illustration of the invention.

Tube holding means 13 includes four pins 24, 25, 26, and 27. Pins 24 and 27 are adapted to be received selectively in different ones in a plurality of holes 28 arranged in an L-shaped configuration including a first straight line extending at a small angle downwardly to the flat plane of slide surface 17 such as approximately 3° and a second straight line extending substantially perpendicular thereto, or substantially parallel to the flat surface of the cutting wheel 15, as best seen in FIG. 5, and pins 25 and 26 are adapted to be received in any one of pairs of spaced holes 29 at opposite sides of the slot 22, as best seen in FIG. 5. The pairs of holes 29 are spaced in a direction parallel to the flat plane of cutting wheel 15 so as to provide a variable height positioning of the apex 30 of the tubing T in the flexed arrangement of FIG. 5 to accommodate different sizes of conventional circular saws. Thus, as shown in FIG. 5, the tube apex 30 extends over the pins 25 and 26 which in this arrangement are received in the upper pair of holes 29 and the portions of tubing T extending away from the tube apex are received inwardly of the pins 24 and 27 in the selected holes 28. Thus, as illustrated in FIGS. 2 and 5, the cutting wheel 15 may be moved transaxially of the tubing T therethrough at the apex 30 which is under tensional stress as a result of the U-shaped deflection thereof facilitating a clean cutting of the tube at the apex. Obviously, different size tubing and tubing having different flex characteristics may be suitably retained by the tube holding means 13 by suitable adjustment of the respective pins as desired. As may be best seen in FIG. 5, the pins 25 and 26 are spaced apart slightly greater than the thickness of cutting wheel 15 to support the tube apex closely adjacent the cutting position.

Support 21 further defines means for mounting the entire apparatus suitably in a vise. Alternatively, the support 21 may be mounted on a suitable base such as base B which may comprise a work table or the like. The support may be provided with suitable holes 31 through which suitable screws 32 may be passed for securing the lower end of the plate to the rear edge of the base B.

The spacing of plates 18 and 19 to define slot 20 may be further maintained by a guard plate 33 which may be secured to the rearward portion of plates 18 and 19 by suitable means such as by welds 34 (FIG. 2). The guard plate may be included as seen in FIG. 2 to be engaged by the pivotal guard 40 of the circular saw tool at the rearward extreme of travel of the circular saw.

Guide means 14 illustratively comprise a pair of metal bars 35 provided at their opposite ends with suitable screw clamps 36 for adjustably locking the opposite ends of the strips to the rear edge portion 37 and front edge portion 38 of plates 18 and 19, respectively.

Thus, in use, apparatus 10 provides for facilitated accurate cutting of a flexible hose or tube by means of a conventional circular saw tool without requiring mechanical connection of the circular saw to the apparatus and permitting the circular saw to be used in a conventional manner as by sliding thereof along a suitable slide surface while guiding the circular saw in a preselected path through the apex of the flexed tubing. The retention of the tube by pins 24–27 may be readily effected by the facilitated adjustability of the pins. By virtue of the rectilinear alignment of the holes 28, further improved facility in controlling flexure of the tubing is provided. While apparatus 10 is extremely simple and economical of construction, it provides an improved facilitated accurate cutting of flexible tubing not obtained with the known tube cutting devices of the art.

The foregoing disclosure of specific embodiments is illustrative of the broad inventive concepts comprehended by the invention.

I claim:

1. Apparatus for cutting flexible tubing by means of a hand tool having a rotary cutting wheel, comprising: a slide plate having a horizontal slide surface and a slot opening therethrough; means on said plate for guiding the hand tool separably horizontally along said slide surface with the cutting wheel projecting through said slot into a cutting space adjacent the opposite surface of said plate; and holding means, said holding means connected to said slide plate for holding flexible tubing in a vertical arcuate configuration with the apex of the arcuate configuration uppermost and adjacent said slot in said cutting space to be cut by the horizontal translation of said hand tool cutting wheel therethrough substantially horizontally transaxially of the tubing, said hose being backed-up by said holding means and positively retaining the hose against horizontal displacement in the direction of the translation movement of the saw therethrough.

2. The apparatus for cutting flexible tubing of claim 1 wherein said guiding means comprises means adjustably mounted on said plate to accommodate any one of a plurality of hand tools having different configurations.

3. The apparatus for cutting flexible tubing of claim 1 wherein said means for holding the flexible tubing comprises adjustable means for accommodating any one of a plurality of different size tubing.

4. The apparatus for cutting flexible tubing of claim 1 further including means for limiting the movement of the hand tool in a direction longitudinally of said slot rearwardly from said cutting space.

5. The apparatus for cutting flexible tubing of claim 1 wherein said slide plate comprises a pair of portions spaced apart to define said slot therebetween and means fixedly connecting said plate portions.

6. The apparatus for cutting flexible tubing of claim 1 wherein said slide plate comprises a pair of portions spaced apart to define said slot therebetween, said means for holding the flexible tubing including a support fixedly connected to each of said plate portions retaining said plate portions in the spaced apart arrangement.

7. The apparatus for cutting flexible tubing of claim 1 further including a guard plate fixedly connected to each of said plate portions at a rearward portion thereof retaining said plate portions in the spaced apart arrangement.

8. The apparatus for cutting flexible tubing of claim 1 wherein said slide plate comprises a pair of portions spaced apart to define said slot therebetween, said means for holding the flexible tubing including a support fixedly connected to each of said plate portions, and further including means for limiting the movement of the hand tool in one direction longitudinally of said slot forwardly of said cutting space, said limiting means defining a stop member fixedly connected to each of said plate portions, said support and stop members being spaced apart longitudinally of said slot and cooperatively retaining said plate portions in the spaced apart arrangement.

9. The apparatus for cutting flexible tubing of claim 1 wherein said means for holding the flexible tubing includes a support, means on the support for supporting the apex of the tubing arcuate configuration, and means adjustable solely parallel to the slide surface for engaging the tubing to deflect the tubing about said apex supporting means.

10. The apparatus for cutting flexible tubing of claim 9 wherein said last named adjustable means comprises a plurality of holes spaced apart perpendicular to said slide surface at opposite sides of said cutting space and pin means selectively received in selected ones of said holes for engaging said tubing.

11. The apparatus for cutting flexible tubing of claim 1 wherein said means for holding flexible tubing in an arcuate configuration comprises a support, means on the support for supporting the apex of the tubing arcuate configuration and means adjustable substantially along a straight line for deflecting the tubing about the apex supporting means, and means movably supporting a cutting means for movement transaxially through said tubing apex.

12. The apparatus for cutting flexible tubing of claim 11 wherein said means for deflecting the tubing comprises a plurality of holes spaced apart by said straight line and pin means selectively received in selected ones of said holes for engaging said tubing.

13. The apparatus for cutting flexible tubing of claim 11 wherein said means for supporting the apex of the arcuate configuration comprises a pair of elements separately fixed to said support to define a space therebetween for receiving the cutting wheel during a tubing cutting operation.

* * * * *